(12) United States Patent
Caretta

(10) Patent No.: US 6,357,502 B1
(45) Date of Patent: Mar. 19, 2002

(54) TIRE WHEEL AND ITS COMPONENTS

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/317,407

(22) Filed: May 24, 1999

Related U.S. Application Data (60) Provisional application No. 60/089,288, filed on Jun. 15, 1998.

(30) Foreign Application Priority Data

Jun. 5, 1998 (EP) ............................................. 98110354

(51) Int. Cl.[7] .............................. B60C 3/00; B60C 5/04; B60C 5/22

(52) U.S. Cl. ..................... 152/454; 152/456; 152/342.1; 152/511; 152/540; 152/541; 152/544; 152/548; 152/550; 152/DIG. 6

(58) Field of Search ................................ 152/454, 455, 152/456, 339.1, 340.1, 342.1, 539, 540, 541, 544, 547, 548, 511, 512, 550, 552, 378 R, 379.3, 381.3, 427, 429, DIG. 6

(56) References Cited

U.S. PATENT DOCUMENTS

| | | | |
|---|---|---|---|
| 3,038,516 A | * 6/1962 | McConkie | 152/511 |
| 3,038,517 A | * 6/1962 | McConkie | 152/511 |
| 3,616,831 A | * 11/1971 | Lafuente et al. | 152/342.1 |
| 4,034,790 A | * 7/1977 | Johannsen et al. | 152/379.3 |
| 5,634,993 A | 6/1997 | Drieux et al. | |

FOREIGN PATENT DOCUMENTS

| | | |
|---|---|---|
| EP | 0 170 085 | 2/1986 |
| EP | 0 590 481 A1 | 4/1994 |
| FR | 2 348 066 | 11/1977 |
| FR | 2 608 514 | 6/1988 |
| WO | WO94/13498 | 6/1994 |

* cited by examiner

*Primary Examiner*—Geoffrey L. Knable
(74) *Attorney, Agent, or Firm*—Finnegan, Henderson, Farabow, Garrett & Dunner, L.L.P.

(57) ABSTRACT

A tire wheel for vehicles comprises a mounting rim which can be associated with a hub of a vehicle and is provided with two bead seats forming a cone, for engagement with corresponding beads of a tire, with its apex on said axis of rotation in a position axially outside said rim, a tire comprising a toroidal carcass provided with a crown portion connected to a pair of axially facing sidewalls terminating in beads for engagement with the corresponding bead seats formed on the rim, said tire having its maximum width in the region of said beads, and an inner tube inserted into the toroidal cavity defined between tire and rim, elastically expandable by means of the introduction of fluid under pressure into its internal volume, and provided with an inflating and deflating device inserted in the wall of said inner tube, without any element for connection to the environment outside the wheel, in particular passing through the wall of the rim.

25 Claims, 5 Drawing Sheets

TIRE WHEEL AND ITS COMPONENTS

This application claims the benefit of U.S. Provisional Application No. 60/089,288, filed Jun. 15, 1998.

BACKGROUND OF THE INVENTION

The present invention relates to a tire wheel for vehicles, i.e. to the assembly comprising a mounting rim designed for connection to a hub of the vehicle itself, a tire mounted on said mounting rim and an inner tube inserted inside said tire, designed to be inflated with a fluid under pressure via a special inflating device.

More particularly, the invention relates, albeit not exclusively, to a tire wheel for use on motor vehicles with very high performance features, i.e. vehicles which are able to produce a high driving torque and reach high speeds both along straight road sections and around bends.

The tire wheels of the type described must be able to satisfy fully various requirements—also partly conflicting with one another—which are associated with the performance features required by the market today.

In particular they must be able to provide the vehicle with an excellent handling performance—particularly as regards the directional and transverse stability—, road-holding power and traction on any type of ground, resistance to aquaplaning, comfort, as well as the capacity to continue travelling over a reasonable distance also in the case of partial or total loss of air (run-flat conditions), without the risk of "unseating", i.e. the condition where one or both of the tire beads comes out of the associated seat formed on the rim.

The Applicants have noticed that, hitherto, these requirements have generally been satisfied individually by a single component from among those which make up the wheel: thus the handling has been attributed to the performance features of the tire, while the resistance to "unseating" has been sought after by means of suitable shaping of the bead seats. As regards the so-called "run-flat capacity", according to a first method, this has been obtained by modifying the carcass structure, strengthening the sidewalls of the tire so as to provide it with a self-supporting capacity; by way of an alternative, in tubeless tires this capacity has been provided by suitable supports mounted on the rim and inserted inside the tire, while in tires with inner tubes an air chamber, or inner tube, divided up into a plurality of circumferential or transverse compartments independent of one another has been used.

The presence of several independent compartments allows the tire to be provided with a sufficient inflation pressure, and hence capacity for emergency travel, even when one of said compartments has suffered a puncture.

It has been found that all these solutions, compared with the advantages offered, also have various disadvantages, such that the overall result obtained is penalized.

In particular, the Applicants have noticed that:
the increase in the structural rigidity of the sidewalls results in a greater weight of the tire and a greater rigidity thereof in all directions—longitudinal, transverse and vertical—which has a negative effect on the driving performance under normal conditions, and on the comfort;
the use of a support inside the tire increases the weight of the tire and does not provide any guarantee as to long resistance during run-flat conditions, when the weight of the car is transmitted onto the support with frictional contact between the radially internal surface of the tire and the radially external surface of the support; and
the solution with inner tube is not practical with so-called low-profile tires, i.e. those tires which have an elliptical cross-section elongated along the axis of rotation, in which difficulties both as regards insertion and use are encountered.

The Applicants have been able to establish, in fact, that the insertion of the inner tube between tire and rim is all the more difficult the lower the cross-section of the tire. In addition to this, traditional inner tubes, during inflation, assume a profile which is substantially circular in cross-section and does not combine properly with the elliptical profile of the low-profile tire, resulting in folds which form on top of one another and prevent correct and complete extension of the walls of the inner tube onto the internal surface of the toroidal cavity, in particular along the sidewalls of the tire. In this way the toroidal cavity is not filled properly and a damaging state of internal tensions in the wall of the inner tube arises, adversely affecting the duration thereof.

Furthermore, as perceived by the Applicants, further problems are associated with the fact that traditional inner tubes are provided with an inflating valve comprising a stem which passes through the rim for connection to the external environment outside the wheel. In particular travel conditions of the tire, this fact represents a risk which at present has not yet been eliminated: it has been found that, in the case of sudden accelerations or decelerations of the vehicle, such as those which are produced by high-performance vehicles which transmit to the ground very high torque values, slipping of the tire with respect to the rim may occur, with consequent tearing of the inner tube at the base of the valve or shearing of the valve stem. When this occurs, there is an immediate deflation of the tire and associated loss of stability of the vehicle, with serious danger for the lives of the driver and passengers of the vehicle itself.

Even the most recent proposition to improve the behaviour of the abovementioned tire wheels as regards the run-flat capacity, and resistance to unseating has not diverged from the known art, envisaging a solid insert inside the cavity defined by the rim and tire assembly.

For the sake of convenience of the description, it is pointed out here that this assembly has a mounting rim which is provided with conical bead seats whose axially external end has a diameter less than that of the axially internal end and is associated with a radial carcass tire, the beads of which match the corresponding seats on the rim while the carcass has a meridian profile, in cross-section, with a constant direction of curvature, the tangent of which, in the vicinity of the bead cores, is substantially parallel to the equatorial plane.

In the embodiment proposed, the rim has bead seats of different diameter and the bead seat of larger diameter is delimited in an axially internal position by a shoulder which is of considerable height so as to prevent unseating on that side, but is difficult to pass over. The wheel is completed with a tread support ring radially extending over about half the cross-section height of the tire: the ring is fitted onto the rim, in the vicinity of the bead seat of smaller diameter and, in the event of deflation of the tire, locks in position the adjacent bead, preventing unseating of the tire on the corresponding side. This wheel is described in detail for example in U.S. Pat. No. 5,634,993, to which reference should be made for further information.

The Applicants have realized that this solution is also not completely satisfactory in relation to the high standards of quality and performance which are nowadays required by the market, i.e. by vehicle manufacturers, by tire retailers and by the users themselves. In particular they have perceived that the version without tread support results in the return to tires with reinforced self-supporting sidewalls, while the internal solid support ring reduces the volume of inflating air which is already small in low-profile tires, thereby reducing the comfort, limits the vertical deformability of the tire, adversely affecting the driving performance, increases the thermal mass forming a harmful barrier against the dissipation of the heat produced during use, and requires a particular constructional form of the rim, which results in the need for a different diameter of the bead seats of the rim, making assembly and disassembly of the ring in particular, and the wheel assembly in its entirety, difficult.

All this having been stated, the Applicants have now discovered that the performance characteristics of a vehicle tire wheel may be further improved by using an assembly of partly known and partly new elements, which forms a tire system capable of developing a mutual interaction between them, resulting in a new vehicle tire wheel which satisfies at the same time and in an optimum manner the performance characteristics required by modern vehicles.

SUMMARY OF THE INVENTION

The aforementioned wheel comprises essentially a wheel rim with bead seats which are inclined towards the axis of rotation, proceeding axially outwards away from the equatorial plane; a tire provided with beads externally shaped in the manner of the corresponding seats on the rim and with a carcass profile, viewed in cross-section, which has its maximum axial width in the region of said beads which are preferably formed with a new structure for fixing the carcass ply to the bead reinforcing core; and an inner tube, which preferably has an elliptical cross-section and which can be inflated by means of an inflation device which does not have any element for connection to the environment outside the wheel, in particular passing through the wall of the rim.

According to a first aspect thereof, the invention therefore relates to a tire wheel for vehicles, comprising a mounting rim which can be associated with a hub of said vehicle, a tire mounted on said rim and comprising a toroidal carcass provided with a crown portion connected to a pair of axially facing sidewalls terminating in beads for engagement with corresponding bead seats formed on the mounting rim, said carcass being provided with at least one reinforcing ply extending from bead to bead, with its ends fixed to reinforcing bead cores inserted inside said beads, the assembly of said tire and said rim defining a toroidal cavity which can be isolated from the surrounding environment at atmospheric pressure, and an inner tube which is inserted in said cavity and can be elastically expanded by means of the introduction of fluid under pressure into its internal volume and is provided with an inflating and deflating device which is inserted in the wall of said inner tube, said wheel being characterized in that:

said rim comprises a substantially cylindrical body, the axis of which forms the axis of rotation of said wheel, the radially external surface of said body having two side portions designed to form said bead seats for engagement with corresponding beads of said tire, each arranged according to a conical surface with its apex on said axis of rotation in a position axially outside said seat with respect to said rim, and a radially more inward central portion with a maximum diameter less than the minimum diameter of said conical side portions;

said tire has a width in the region of said beads at least equal to its maximum width in the region of said sidewalls;

said device does not have any system for connection to said rim, designed to fix the circumferential position of said inner tube with respect to the rim.

The abovementioned tire wheel is provided, on the rim, with means for introducing and removing fluid under pressure respectively into and from the toroidal cavity defined between tire and rim.

Preferably, the angle at the apex of said conical surfaces of the bead seats is between 8° and 60°. The abovementioned bead seats are axially delimited towards the outside each by a flange diverging in a direction radially outside the rim and inclined with respect to the equatorial plane at an angle of between 40° and 50°, while towards the inside they are each axially delimited by a shoulder, the axially external surface of which converges towards the equatorial plane in a direction radially outside the rim and is inclined with respect to said plane at an angle of between 0° and 30°.

Even more preferably, the difference between the maximum diameter of said central portion, on the radially external surface of the abovementioned cylindrical body, and the minimum diameter of said bead seats is between 10% and 20% of said minimum diameter; the difference between the external diameter of said flange and the minimum diameter of the corresponding bead seat is between 1% and 5% of the value of said minimum diameter.

According to a second aspect thereof, the invention also relates to a tire wheel as described, in which the bead seats have a different distance from the axis of rotation of said wheel, where the difference between the minimum diameter of the bead seat of larger diameter and the maximum diameter of the bead seat of smaller diameter, which is axially opposite, is between 3% and 6% of the value of said maximum diameter.

Preferably, in this case, the rim is designed for mounting on the vehicle with the bead seat of larger diameter facing the vehicle itself.

According to a different aspect thereof, the invention relates to a tire wheel of the type described, fitted with a tire in which the bead reinforcing core comprises at least two radially superimposed layers of metal wires which are wound in turns arranged axially alongside one another and extending substantially over the entire axial extension of the corresponding bead seat and are arranged substantially parallel to the surface of the bead seat, where the minimum diameter of the radially innermost layer is not less than the diameter of the adjacent flange and its maximum diameter is not greater than the diameter of the adjacent shoulder.

The layers are preferably formed by high carbon content steel wires and may consist of a spiral of a single metal wire, with a diameter of between 0.9 mm and 1.5 mm, or a spiral of stranded metal cord where the basic filament of said strands has a diameter preferably of between 0.22 mm and 0.38 mm.

The bead core may comprise either layers consisting of basic filaments or layers of cords or a combination of said layers.

With this type of bead core, preferably the end of the carcass ply is inserted, axially from the inside outwards, between said layers.

In a preferred embodiment in which the end of said carcass ply comprises two axially separate portions of fabric, a first portion of fabric is arranged in position radially inside the radially innermost layer of metal wires, while the second portion of fabric is inserted in position radially inside the radially outermost layer of said wires, separated from the radially innermost layer by an insert of elastomeric material which extends radially beyond the axially internal end of said layers of metal wires towards the sidewall of the tire and which has a hardness of not less than 70° Shore A.

According to a further aspect thereof, the invention relates to a tire wheel as described, in which the inner tube has been moulded and vulcanized with a toroidal shape having an internal volume not less than one third of the final volume of use, and has preferably been moulded and vulcanized with an elliptical shape.

Even more preferably, the inner tube comprises at least two circumferential volumes which are separate and independent of one another, being separated by a longitudinal wall extended in a plane perpendicular to the axis of rotation of the wheel, each volume being provided with said inflating device. Even more preferably, this wall has a rigidity which is greater than that of the axially outermost part, i.e. the sidewalls, of said inner tube. In addition or by way of alternative, this wall contains at least one duct which extends internally over the whole radial extension of the wall, opening out on both the extrados and intrados surfaces of the inner tube.

According to yet another aspect thereof, the invention relates to a tire wheel as described, in which said inflating and deflating device comprises a rigid body incorporating at least one inflating valve, one calibration valve and one discharge valve.

BRIEF DESCRIPTION OF THE DRAWINGS

In any case the present invention will now be better understood with reference to the description which follows and to the accompanying figures, provided solely by way of explanation and without being intended as limiting in any way, in which.

DETAILED DESCRIPTION OF THE INVENTION

Figure 1:
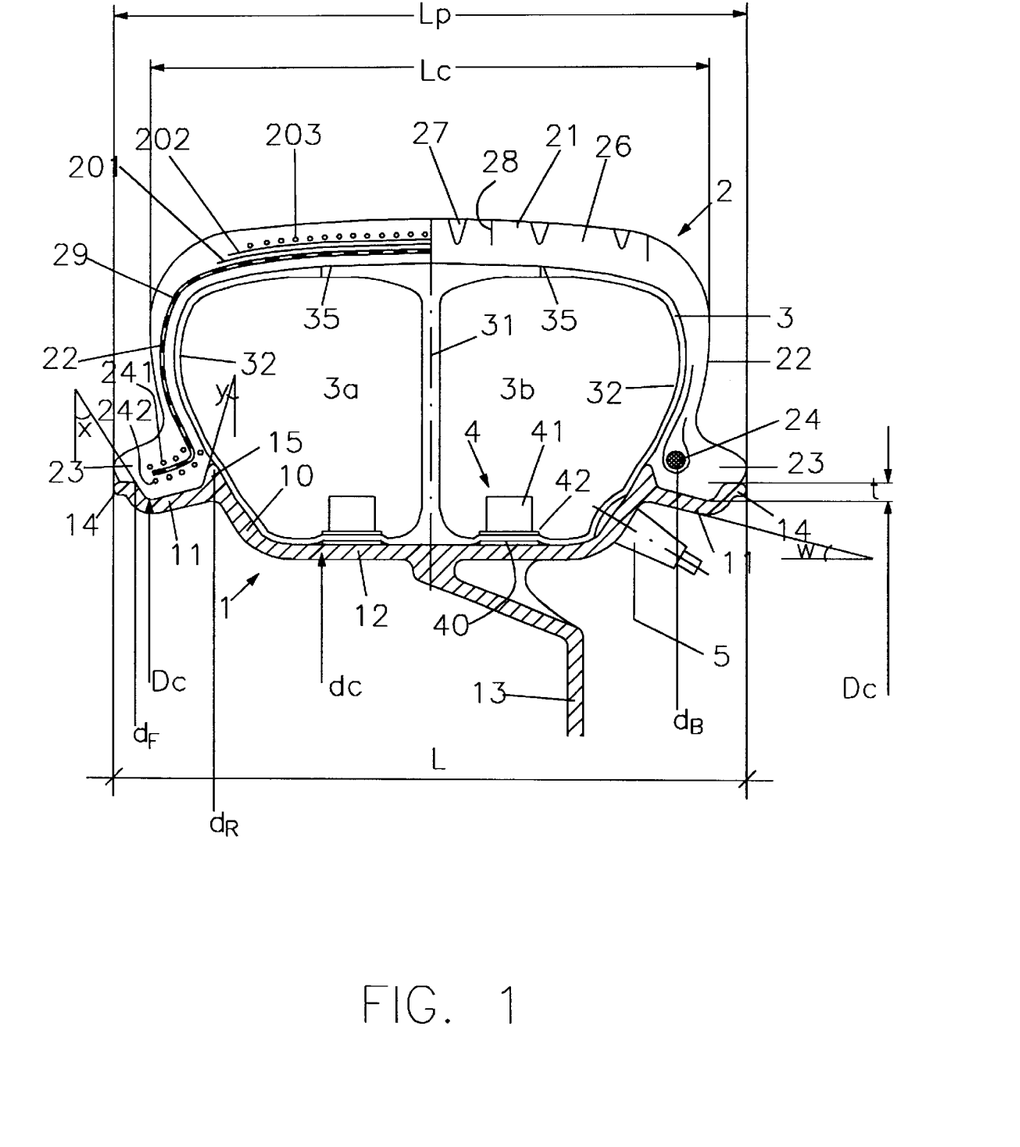
FIG. 1 shows a partial cross-sectional view of the wheel according to the invention in a preferred embodiment, including a new bead structure for the associated tire.

With reference to FIG. 1, the wheel according to the invention comprises a mounting rim 1 on which a tire 2 is mounted: the toroidal cavity defined between the internal surface of the tire and the radially external surface of the rim contains an inner tube 3 provided with at least one inflating device 4 which can be inflated by means of the introduction of air from outside the rim via a special valve 5. The abovementioned inner tube, which is dilated owing to the effect of the inflating pressure, occupies the entire cavity and rests against the aforementioned surfaces of the tire and the rim.

The rim 1 comprises a substantially cylindrical body 12, the axis of which (not shown) forms the axis of rotation of the wheel and which is connected to a disc 13 lying in a plane perpendicular to the axis of rotation and having the function of fastening the rim, and hence the wheel, to a hub of the vehicle.

The radially external surface of the abovementioned body has two side portions 11 which are designed to form the bead seats for engagement with corresponding beads of the tire and are each arranged according to a conical surface with its apex on the axis of rotation, in a position axially outside the seat with respect to the rim, and a radially more inward central portion, with a maximum diameter less than the minimum diameter of the bead seats.

More precisely, the radially external diameter $D_c$ of the axially external end of the bead seat 11 identifies the fitting diameter of the tire and is taken as being the nominal diameter of the rim: the radially external surface of the abovementioned central portion of the rim has a diameter $d_c$ with a value preferably of between 80% and 90% of $D_c$.

Preferably, the angle at the apex of said conical surfaces of the bead seats is between 8° and 60°, i.e. the angle w of said conical surfaces with respect to the axis of rotation is between 4° and 30°; in the example illustrated it is equal to 15°, being the same for both the seats. Moreover the angle of one seat may also be different from that of the other seat, should this prove to be more advantageous, although it is preferably always within the range of the values specified above.

The bead seats are axially delimited towards the outside each by a flange 14 preferably diverging in a direction radially outside the rim and inclined with respect to the equatorial plane at an angle x, which is preferably between 40° and 50° and in the example illustrated is equal to 45°, being the same for both flanges. Moreover the angle of one flange may also be different from that of the other flange, should this be more advantageous, although it is preferably always within the range of the values specified above.

The radially external diameter $d_F$ of said flanges exceeds the nominal diameter of the rim by a value preferably between 1% and 5% of said nominal diameter.

The bead seats are axially delimited towards the inside each by a shoulder 15 with an axially external surface preferably converging towards the equatorial plane in a direction radially outside the rim and inclined with respect to said plane at an angle y which is preferably between 0° and 30° and which, in the example illustrated, is equal to 15°, being the same for both shoulders. Moreover the angle of one shoulder may also be different from that of the opposite shoulder, should this be more advantageous, although it is preferably always within the range of the values specified above.

The value of the radially external diameter $d_R$ of said shoulders is preferably between 106% and 108% of the value of the nominal diameter.

The radially more inward central portion of the rim is connected to the abovementioned bead seats by means of two walls 10 which are preferably diverging and radially extended outwards and which, together, define a channel useful for facilitating mounting of the tire and inner tube onto the rim: in a wall of the channel there is advantageously formed a hole in which an inflating valve 5 of the type commonly used with tubeless tires is mounted.

The maximum axial distance between the abovementioned flanges 14 defines the width L of the rim.

The tire 2 comprises a toroidially shaped carcass having a peripheral portion 21 and two axially opposite sidewalls 22 terminating in a pair of beads 23, each provided with at least one reinforcing bead core 24 for fixing the tire to the corresponding mounting rim 1.

A tread band 26 is located on the periphery of said carcass and is moulded with a design in relief comprising grooves 27 and cuts 28, in a manner known per se, which are varyingly arranged depending on the type of use envisaged for the tire.

The carcass is provided with at least one reinforcing ply 29 extending from bead to bead, with its ends fixed to the abovementioned bead cores.

If the tire is of the radial type, the reinforcing cords of the abovementioned ply lie substantially in planes containing the axis of rotation of the tire; moreover, between the carcass and the tread band there is inserted a belt structure comprising preferably at least two radially superimposed layers 201 and 202 of metal cords which are parallel with one another in each layer and intersecting with those of the adjacent layer and which are inclined, preferably in a symmetrical manner with respect to the equatorial plane of the tire. Even more preferably, the abovementioned structure, in a radially external position, also comprises an additional layer of textile cords 203 which are advantageously made of heat-shrinkable material and are arranged parallel to the equatorial plane.

The angle of inclination of the cords of the intersecting belt layers, with respect to the equatorial plane, is preferably between 5° and 30°: in connection with specific embodiments of the belt structure and/or tire the abovementioned angle may also have a different value in the two layers.

The abovementioned tire has its maximum width $L_p$ at the point corresponding to the maximum axial extension of the beads, and this width is at least equal to, but preferably greater than, the maximum width $L_c$ measured on the sidewalls of the tire.

In other words, the external profile of the cross-section of the tire does not extend axially beyond the external edge of the flange 14 of its mounting rim.

The bead of the tire is externally shaped so as to match at least the profile of the bead seat and the adjacent walls of the flange and the shoulder: however, preferably it extends in an axial direction outwards so as to cover also the radially external surface of the flange 14.

The internal structure of the bead may comprise a reinforcing bead core 24 made with one of the various known structures, for example of the bunched type or twisted type; in any case the radially internal diameter $d_B$ of said bead core must have a value not less than $d_F$ and not greater than $d_R$.

FIG. 1 illustrates, in the left-hand half, a particular preferred embodiment of a bead structure, according to the invention.

In this embodiment the bead core comprises at least two radially superimposed layers 241 and 242 of metal wires which are wound in turns arranged axially alongside one another and extending substantially over the entire axial extension of the corresponding bead seat, while the end of the carcass ply is inserted, axially from the inside towards the outside, between the abovementioned layers.

The layers are arranged parallel to the axis of rotation or, more preferably, substantially parallel to the bead seat. For the radially innermost layer the condition already described for the traditional bead wire also applies: basically its minimum diameter must not be less than $d_F$ and its maximum diameter not greater than $d_R$.

The layers are formed by wires made of steel with a high carbon content (type HT, i.e. with a carbon content greater than 0.8%). Each layer may be formed by a spiral of a single metal wire with a diameter of between 0.9 mm and 1.5 mm. Preferably the layer is formed by a spiral of stranded metal cord comprising preferably seven strands each with three basic filaments. The basic filament of the strands preferably has a diameter which is between 0.22 mm and 0.38 mm, and even more preferably equal to 0.28 mm or alternatively to 0.36 mm. In other words, the preferred cords for the formation of said layers, according to the usual method of identification in the sector, are 7×3×0.28 and 7×3×0.36. The bead core may comprise either layers of single wires or layers of cords or a combination of said layers.

The embodiment with metal cords is preferred in order to provide the bead core with the necessary flexibility, during mounting and removal of the tire onto/from the rim, such that the flange 14 of the rim can be passed over without any structural damage being suffered.

Figure 2:
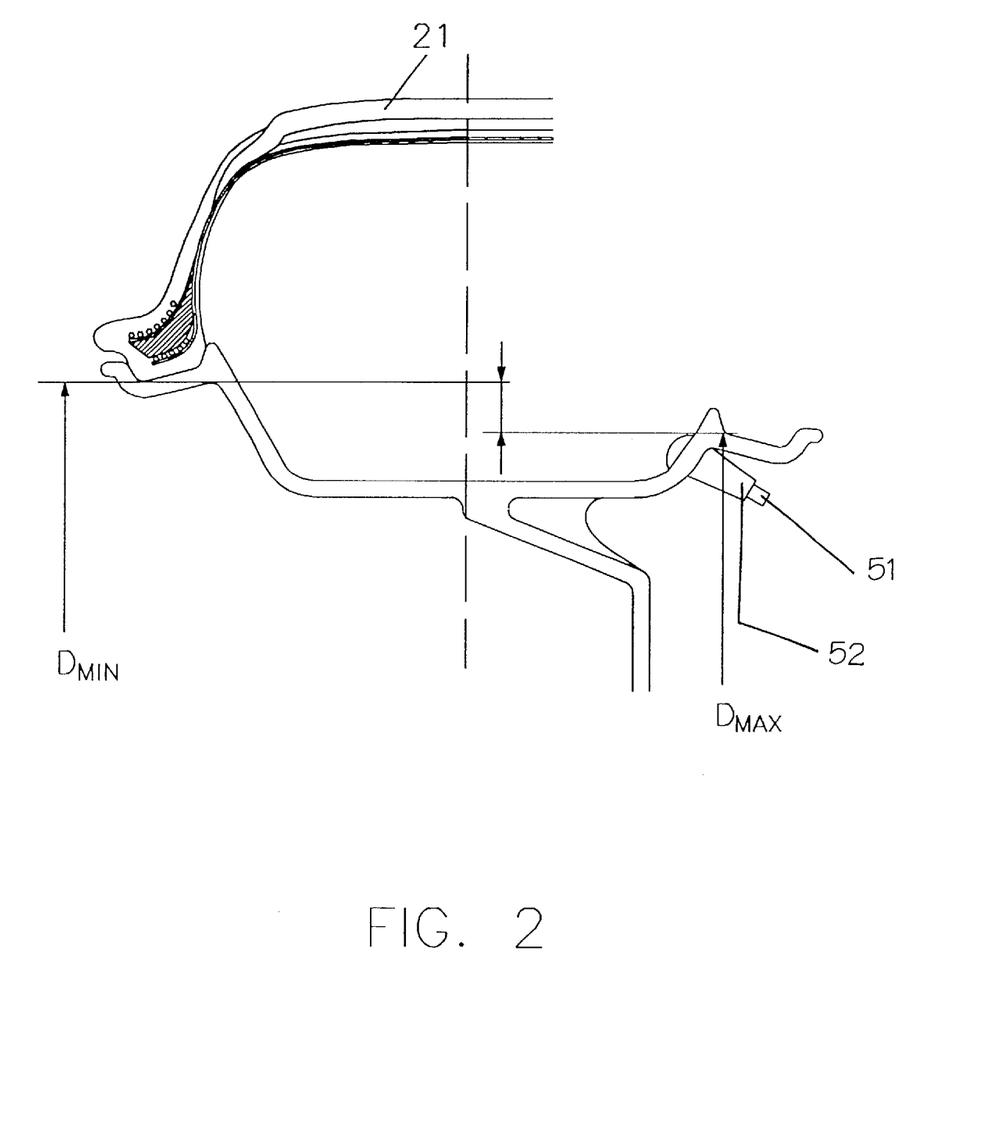
FIG. 2 shows the wheel according to FIG. 1, without inner tube, in a second embodiment both of the rim and of the beads of the tire.

FIG. 2 shows a second advantageous embodiment of the wheel according to the invention, which differs from that already described owing to the fact that the bead seats have a different diameter. In particular the difference between the diameter $D_{MIN}$ of the bead seat of larger diameter and the diameter $D_{MAX}$ of the bead seat of smaller diameter, which is axially opposite, is preferably between 3% and 6% of the value of the nominal diameter.

With this embodiment the minimum diameter of the bead seat of smaller diameter is taken as being the nominal diameter of the rim and the wheel is preferably mounted on the vehicle with the bead seat of larger diameter located on the vehicle side.

The figure also shows a different embodiment of the bead of the tire distinguished by the fact that the reinforcing carcass comprises two carcass plies or in any case the end of the ply is separated into two axially separate portions of fabric: in this case a first fabric portion is arranged in position radially inside the radially innermost layer of metal wires, while the second fabric portion is inserted in position radially inside the radially outermost layer of said wires, being separated from the radially innermost layer by an insert of elastomeric material with a high hardness factor which extends radially beyond the axially internal end of the layers of metal wires towards the side of the tire. The hardness of said insert is preferably equal to, or even more preferably, greater than 70° Shore A.

Figure 3:
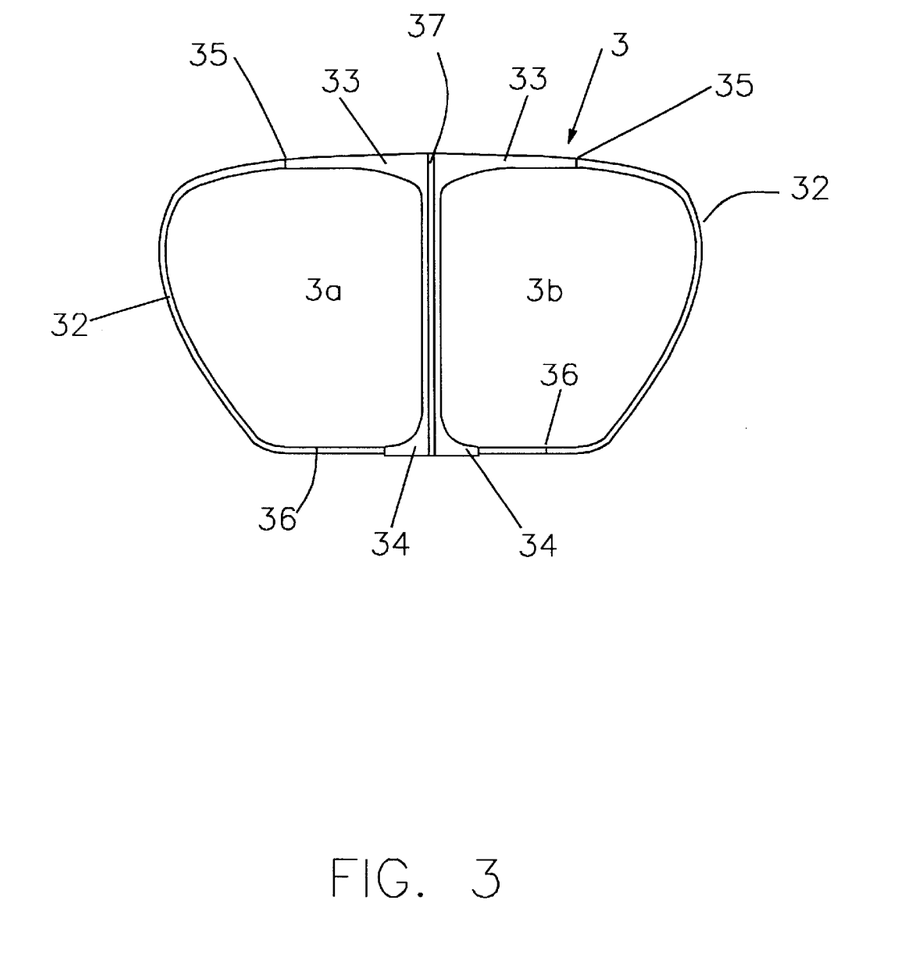
FIG. 3 shows, again in cross-section, an example of a preferred embodiment of the inner tube according to the invention.

As regards the diameters of the radially innermost layer, the same conditions already mentioned when illustrating the embodiment according to FIG. 1 apply. The inner tube 3 illustrated in FIGS. 1 and 3 is preferably an inner tube which is made of elastomeric material and is divided up into at least two parts separate from one another, i.e. a central core comprising a wall 31 and a pair of sidewalls 32.

In other words, said inner tube comprises two circumferential volumes 3a and 3b which are separate and independent, being separated by a longitudinal wall 31 extending in a plane preferably perpendicular to the axis of rotation of the wheel, even more preferably in the equatorial plane.

Preferably this wall, and also the zones immediately surrounding it, have a rigidity greater than that of the axially outermost part, i.e. the sidewalls 32 of the inner tube, so that during inflation of the tube inside the tire the expansion of the tube in the axial direction is greater than that in the radial direction. In this way the central portion of the inner tube comes into contact with the tread zone at the same time as its sidewalls come to rest fully against the sidewalls of the tire, preventing the occurrence of any abnormal tensions inside the walls of the inner tube itself.

It must be pointed out moreover that, within the scope of the present invention, the inner tube is not necessarily elliptical nor provided with independent volumes. In other words, the wheel according to the invention may equally well comprise also an inner tube with a substantially circular and/or mono-volume cross-section.

More specifically, the inner tube illustrated is particularly suitable for tires with an elliptical cross-section, in which the dimension of the smaller axis, parallel to the equatorial plane, is smaller than the dimension of the larger axis, parallel to the axis of rotation, i.e. for those so-called "low-profile" tires, in which the ratio between the cross-sectional height, measured between the base of the beads and the top of the tread, and the maximum width of the tire, is equal to or less than 0.7.

In the particular embodiment of the tire, previously described and illustrated in FIG. 2, the condition expressed by this ratio must be verified along the centre line of the tire provided with the sidewall of greater radial extension.

More preferably, the central core consists in the wall 31 from the ends of which two flanges, respectively a radially external flange 33 (extrados flange) and a radially internal flange 34 (intrados flange), extend, perpendicularly with respect thereto, in axially opposite directions over a section of predetermined width.

The adjacent ends of the sidewalls and the flanges are jointed together, those in a radially external position along the circumferential joining lines 35, and those in a radially internal position along the circumferential joining lines 36. The joint is preferably realized by means of chemical bonding in the form of vulcanization.

In accordance with one aspect of the invention, it has been envisaged manufacturing the inner tube with a different rigidity of the separate portions, and more precisely with the core having a rigidity greater than that of the sides. In a preferred embodiment illustrated in FIG. 3, where the various parts of the inner tube have been manufactured with the same elastomeric material, the greater rigidity of the core compared to the sidewalls has been obtained by suitably increasing the cross-section (thickness) of the core with respect to that of the sidewalls. The ratio between the average value of the thickness of the core and that of the sidewalls in the preferred embodiment according to the invention may vary between 1 and 4.

In more detail, in the example according to FIG. 3, the inner tube has a constant thickness of 5 mm along the wall 31, which is greater in the connection zone between wall and flanges, then tapers until it reaches the thickness of 2 mm in the joining zone with the sidewalls, and then remains constant in the sidewalls.

In an alternative solution to that mentioned, the greater rigidity of the core compared to that of the sidewalls is obtained with the aid of materials which are different from one another, using for the core an elastomeric material having a modulus greater than that of the material of the sidewalls: in this case the thickness of the core may be equal to or different from that of the sidewalls.

In the preferred alternative embodiments according to the invention the ratio between the moduli of the materials respectively of the core and the sidewalls may be in the range of values between 1 and 10, and more preferably between 1 and 5.

The value of the modulus of the material of the core is preferably between 1.5 and 10 N/mm$^2$.

It is pointed out here that "modulus" is understood as meaning the nominal value of the force corresponding to an elongational deformation of 100%. The measurement of the value of the modulus is performed in accordance with the standard ISO 37 (Ring type A).

Preferably the sidewalls of the inner tube may be based on butyl rubber or butyl halogen rubber and the central core may be based on diene elastomers such as, among others, stirene butadiene, polybutadiene and natural rubber.

In a further solution, the greater rigidity of the core compared to the sidewalls may be achieved with materials of the same or a different composition and having the same or different thicknesses, by incorporating suitable reinforcing fillers in said materials; in a preferred solution these fillers comprise short fibres (dimensions equal to or less than 7 mm), in particular those obtained by grinding aramide fibres (dimensions equal or less than 1 mm) known as "aramide paste" (for example Kevlar®-Pulp or Twaron®-Pulp), where Kevlar and Twaron are registered trademarks of the companies Du Pont and AKZO, respectively.

Preferably the quantity of said short fibres is comprised between 1 and 5 phr (parts per hundred parts of rubber); in a particular preferred embodiment only the elastomeric material of the core contains such fibrous reinforcing fillers.

Preferably also the different parts of the central core are provided with a different rigidity, in one case the maximum rigidity being conferred on the intrados flange, compared to the rigidity of the wall and the extrados flange, so as to control in an optimum manner expansion of the walls of the inner tube during inflation thereof, thus allowing complete adaptation of these walls to the internal surface of the tire. For this purpose, preferably the inner tube is moulded and vulcanized with a toroidal shape having an internal volume not less than one third of the final volume of use and, even more preferably, the inner tube is moulded and vulcanized in an elliptical shape. Even more preferably, the wall 31 contains at least one duct 37 which extends internally over the entire radial extension of the wall, opening out on both the extrados surface and the intrados surface of the inner tube. Preferably the inner tube comprises a plurality of these ducts which are circumferentially spaced with respect to one another in a uniform manner, i.e. are mutually staggered by the same angular amount.

Preferably these ducts are at least three in number, but more preferably are a greater number, even more preferably at least six, and preferably have a diameter of between 3 mm and 15 mm, even more preferably equal to 12 mm.

Owing to the presence of these ducts, during inflation of the inner tube, the air which remains trapped between the radially external surface (extrados surface) of the inner tube and the radially internal surface of the peripheral portion of the tire is able to flow out towards the space comprised between the radially internal surface (intrados surface) of the inner tube and the facing surface of the rim, and from here towards the external environment by means of the inflating valve 5, in the open position.

In accordance with the invention, the inner tube described here is provided with an inflating device 4 inserted in its wall, preferably the intrados wall, without any element for connection to the external environment, passing through the rim.

In general the abovementioned inflating and deflating device comprises a rigid body 41 preferably made of plastic material and provided with a group of valves, each of which is delimited by a casing which has, arranged inside it, the associated activation mechanism, i.e. the part of the valve operating between an open position and a closed position, respectively, so as to allow or prevent the flow of pressurized air in either of the two directions through the casing.

In particular, the group comprises three valves, respectively for inflation, calibration and deflation, and allows one to carry out at least three operations fundamental for providing the tire with the correct operating pressure, namely rapid inflation to an overpressure, attainment (calibration) of the desired pressure value and rapid deflation of the inner tube.

The rigid body 41, which has a preferably cylindrical configuration, is mounted inside a special bush 42 defining a circular through-opening formed in the wall of the inner tube, preferably on the radially internal (intrados) surface.

Preferably the abovementioned rigid body comprises an annular portion of its external surface which is threaded so as to allow screwing thereof inside the bush 42 and a bottom flange 40 which allows its position to be fixed with respect to the bush.

Figure 4:
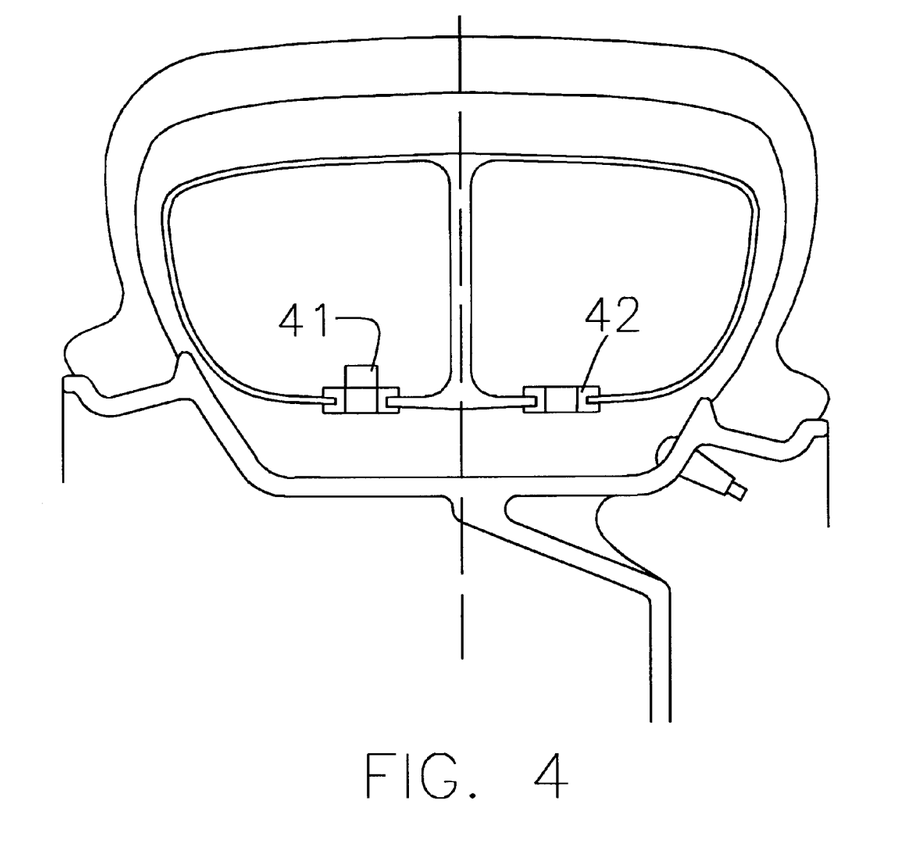
FIG. 4 shows the wheel according to the invention, after assembly of the component elements, prior to inflation of the inner tube.

As can be clearly seen from FIGS. 1 and 4, the abovementioned rigid body 41 and the group of valves contained therein is completely isolated from the surrounding environment and therefore does not have any element for connection to the environment outside the wheel, passing through the wall of the rim. Moreover, the inner tube provided with such a device is free to move into any position inside the cavity delimited by the tire and the surface of the rim.

In a preferred embodiment of the invention a single valve performs all three functions envisaged, namely inflation, calibration and deflation, with the result that the device is light, compact and occupies a limited amount of space.

This valve (FIG. 5) preferably comprises a cylindrical casing 60 flanged on the end projecting outside the inner tube and provided with an external threading 61 or any other equivalent form of fastening (rapid coupling, etc.) in the vicinity of said flanged end for mounting inside the bush 42 already described.

Figure 6:
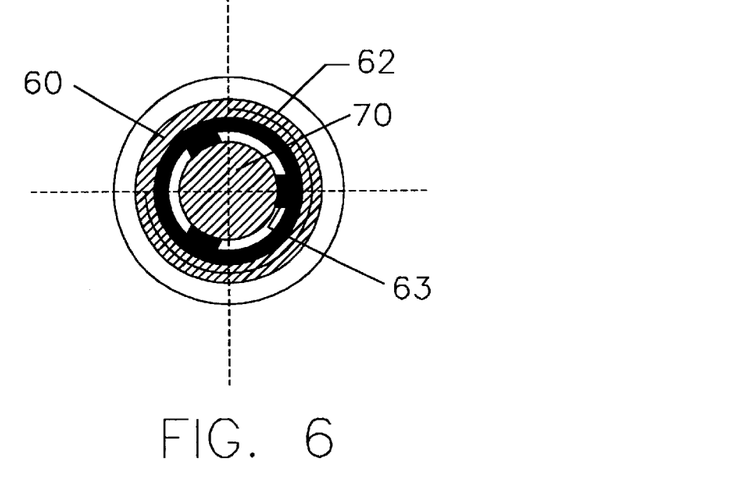

A ring 62 is mounted inside said flanged end by means of screwing or in some other advantageous manner and is provided with at least two, but preferably three or more projections 63 (FIG. 6) projecting radially towards the inside.

The axially opposite end of the cylindrical casing 60 is closed by a circular crown 64 (FIG. 7) integral with a duct 65 welded onto the axially internal surface of said crown and provided with two openings, respectively 66 on the side surface of the cylindrical casing and 67 on the side surface of the duct, directed towards the flanged end of the casing and preferably coaxial therewith.

Figure 7:
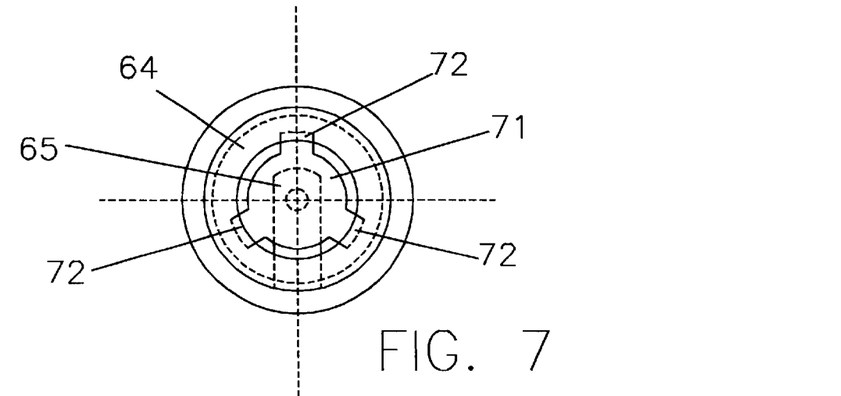

A bowl-shaped cage 68 is screwed, or otherwise fixed, in a coaxial position, on the circular crown 64, and a lens-shaped element 69, with its concavity directed towards the cylindrical casing, is movable inside the bowl and rests on the circular crown.

Figure 5:
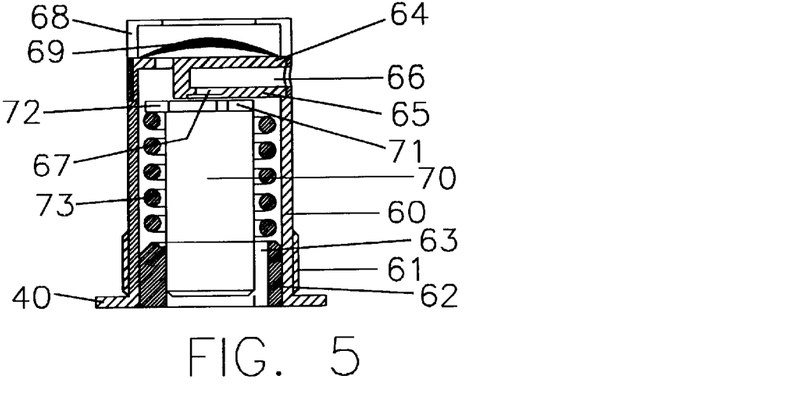
FIGS. 5 to 7 show three different views, respectively an axial cross-sectional view and two separate sections perpendicular to the axis, of a preferred embodiment of the device for inflating the inner tube.

A coaxial stem 70 is arranged inside the cylindrical body 60 and is axially slidable and in particular guided between the projections 63 of the ring 62: the axial surface of the stem directed towards the circular crown is integral with a disc 71 which preferably has a diameter greater than that of the stem 70 and even more preferably is provided with lugs 72 radially projecting in cantilever fashion from the periphery of the disc. The abovementioned stem 70 is preferably a permanent magnet made of sintered alloy, preferably comprising ferromagnetic material.

Finally, a compressed spring 73 surrounds the stem 70, resting against the ring 62 at one end and against the projecting edge of the disc 71, and/or against the lugs 72, at the other end.

The thrusting force of the spring is calibrated on the basis of the operating pressure of the tire and hence the inner tube.

During the inflation stage, the pressurized air acting outside the inner tube flows into the cylindrical body, passing between the side surface of the stem 70 and the ring 62 and, from here, passing by the disc 71 and flowing through the circular crown 64, displaces the lens-shaped element 69 from its rest position on the rim and enters into the inner tube, passing through the cage 68 which exclusively performs the function of retaining the lens-shaped element within a predetermined space.

As soon as the pressure acting inside the inner tube exceeds the value of the external pressure, the lens-shaped element is compressed against the circular crown, closing its central hole, so as to prevent air passing from inside to outside the inner tube.

If the value of said internal pressure exceeds the calibration value of the spring, the pressurized air which is inside the duct, in communication with the inner tube via the hole 66, compresses the spring, displacing the disc 71 and the associated stem 70 away from the duct, thus allowing the air to flow out through the hole 67 towards the flanged end of the cylindrical body and from here into the outside environment.

As soon as the internal pressure, decreasing in value, has become less than the calibration value of the spring, the latter extends, bringing back immediately the disc 71 against the duct 65 so as to close the hole 67.

Should one wish to perform rapid deflation of the inner tube it is sufficient to apply a magnetic field which acts on the stem 70, drawing it towards the flanged end of the cylindrical body, so as to displace the disc 71 and open the hole 67, as already described.

The magnetic field will keep the pin in the open position of the hole for the whole of the period required by the operator.

Having now understood the invention, the person skilled in the art is able to design and manufacture other types of valves which do not have elements for connection to the external environment, in accordance with the invention, and which are able to perform at least the three functions described here.

For example, it could be possible to replace the simple magnetic actuator of the deflating valve with an active device, for example a miniaturized solenoid valve, and a radio-wave or ultrasound receiver designed to operate the solenoid valve after receiving a suitable coded signal.

The solenoid valve could be of the electromagnetic type, or comprise phase-changing actuators, fusible diaphragms, components made of shape-retaining material, electric micromotors, piezoelectric actuators and other similar devices.

The mode of operation of the wheel assembly and the many advantages achieved by it may now be easily understood.

Firstly, under normal travel conditions, the particular carcass profile produced by the maximum axial width in the region of the beads, allows the tire to maximize the slip thrust with an advantageous effect on the quality of the driving performance.

As regards the capacity to prevent unseating, it must be remembered first of all that, during run-flat conditions, particularly along a curved trajectory, a very high axial thrust, directed towards the inside of the tire, acts on the bead on the outside of the bend, while a thrust directed towards the outside, but of a more limited value, acts on the bead on the inside of the bend.

In the wheel according to the invention, the thrust towards the inside is effectively opposed by the shoulder 15 which cannot be passed over by the bead since the minimum diameter of the reinforcing bead core is less than the diameter of the shoulder. On the other hand, the radially external diameter of the flange 14 is substantially equal to or less than the minimum diameter of the bead core, but in this direction, i.e. axially towards the outside, the limited value of the thrust applied to the bead is insufficient to cause the bead to be dislodged from its seat and the flange 14 to be passed over, in view of the rigidity and the consequent indeformability of the structure of the bead as a whole.

These dimensions of the shoulder and the flange on the bead seats do not constitute, however, an obstacle for mounting and removing the tire which, on the contrary, can be performed more easily compared to the wheels of the state of the art.

The method for mounting and inflating the tire 2 on the rim 1 involves initially the step of fitting a first bead on the rim until it is arranged in the associated bead seat.

The first bead of the tire is made to pass over the two shoulders by ovalizing the bead core and making use of the central channel present on the rim in order to offset the axis of the tire with respect to the rim.

Then the inner tube, already provided with its inflating device, is introduced into the space, not yet closed, delimited between tire and rim and then the second bead is fitted onto the rim by inserting it into the associated bead seat.

Passing of the second bead over the flange is facilitated by the value of the ratio between the mutual diameters.

The embodiment illustrated in FIG. 2 further facilitates assembly of the wheel with a low-profile tire: insertion of the inner tube inside the tire, passing it through the space delimited between a bead of the tire and the flange of the corresponding bead seat, could prove to be difficult in the case of a symmetrical rim. Instead, in the asymmetrical wheel according to the invention, during fitting of the tire onto the rim, the bead of maximum diameter is first inserted into the bead seat of minimum diameter and this greater space between the bead seat of the rim and the bead of the tire allows easier insertion of the inner tube into the wheel cavity.

Advantageously, the greater ease of insertion of the inner tube into the abovementioned cavity results in a substantial saving in time and greater appeal of the product to personnel who carry out maintenance and replacement operations.

In the wheel according to the invention, the means for introducing and removing air comprise the usual valve for inflating tubeless tires essentially consisting of a tubular element 51 containing the activation mechanism for the inflating and deflating operations and having one end incorporated in a rubber plug 52 inserted in an airtight manner inside a corresponding hole in the rim wall and provided at the opposite end with a special closing cap, not shown.

In order to inflate the wheel according to the invention, the cap is removed from the tubular element 51 and, using any tool, for example an ordinary compressed-air supply gun provided with a pressure gauge, pressurized air is introduced inside the space between tire and rim.

The pressure value of the air introduced is chosen so as to be sufficiently high, preferably between 150% and 200% of the operating pressure. As soon as the fixed pressure value is reached, which can be easily detected using any known device (pressure gauge), the introduction of pressurized air is stopped.

The high-pressure air initially deforms the inner tube, basically compressing it onto itself; however, the inner tube, having been advantageously moulded with a torus shape, memorizes this shape and reacts to the deformation, generating internal tensions which cause it to reassume its toroidal configuration.

This reaction to compression is further favoured by the presence of the central core which has a greater rigidity than that of the sidewalls.

In these conditions a pressure which is lower than the external pressure of the cavity is created inside the inner tube, with a consequent flow of air towards the inside of the tube via the inflating device according to the invention. As the internal volume of the tube is gradually filled with pressurized air, the tube dilates gradually returning to its moulded shape until it reaches, after a certain period of time, a pressure equilibrium between the inside of the tube and the external cavity between tire and rim.

The air inlet tool is now removed from the tubular element 51 so that all the pressurized air contained in the cavity is discharged through the latter, so that this cavity assumes the value of atmospheric pressure.

The difference in pressure between the inside of the inner tube and the cavity completes dilation of the inner tube 3 until the intrados surface of the latter is pressed up against the bottom surface of the rim.

Since the pressure reached inside the inner tube is greater than the predetermined operating pressure, the calibration valve opens, as described above, and then closes again, isolating the inside of the inner tube from the external environment, when the difference between the pressure inside and the pressure outside the inner tube, corresponding to the atmospheric pressure since the cap of the valve 5 has been removed, corresponds to the working pressure on the basis of which calibration of the inflating device was performed.

Once the operation of inflation of the inner tube and calibration of the pressure to the predefined value has been performed, the closing cap is applied onto the tubular element 51, also isolating the wheel cavity from the external environment.

If the pressure inside the inner tube must be increased, for example in order to restore the value of the working pressure, the inflation procedure described above is repeated from the start.

Rapid deflation of the inner tube, as already seen, is performed by causing displacement of the obturator of the device from its closing position.

The inflating and deflating device according to the invention offers numerous advantages compared to the valves associated with an inner tube according to the state of the art.

This is because owing to the absence of elements connecting the inner tube and the environment outside the wheel, said device always remains intact and perfectly functional, eliminating the deflation caused by slipping of the tire on the rim or other accidental factors, for example impacts of the part projecting from the rim of conventional valves against obstacles in the road, or other problems such as the loss of the closing cap.

Moreover proper inflation of the inner tube is advantageously ensured by the fact that the calibration function is no longer performed manually by an operator, but is assigned to an automatic device which ensures precisely predefined working pressure values which are always the same for each inner tube inflating operation.

Moreover the inflating device according to the invention, which does not have parts associated with the inner tube and projecting from the rim, allows the inner tube to be arranged rapidly and without distortion inside the cavity between tire and rim.

In fact, the present characteristic embodiment of the inflating valve eliminates the complex and difficult operations which are required with the conventional valves according to the state of the art in order to insert the stem of the valve of the inner tube from inside the cavity between tire and rim towards the outside, through the appropriate hole provided on the rim.

The inner tube with at least two independent compartments forms a safety device which is able to provide the tire with stability and supporting properties even when one of the compartments is partially or totally deflated following a puncture. The presence of several independent compartments allows the tire to be kept at an adequate inflation pressure suitable for ensuring good travel characteristics (speed, distance and comfort) even during emergency travel conditions.

Preferably, in this case, each compartment is provided with its own device as described and illustrated above.

Advantageously, owing to the characteristic features of the invention, rapid and easy extraction of the inner tube from the wheel is obtained when it is required to replace the tire, the inner tube or its inflating device which is mounted in the wall of the tube so as to be easily separable therefrom.

What is claimed is:

1. Tire wheel for vehicles comprising a mounting rim which can be associated with a hub of said vehicle, a tire mounted on said rim and comprising a toroidal carcass provided with a crown portion connected to a pair of axially facing sidewalls terminating in beads for engagement with corresponding bead seats formed on the mounting rim, said carcass being provided with at least one reinforcing ply extending from bead to bead, with its ends fixed to reinforcing bead cores inserted inside said beads, the assembly of said tire and said rim defining a toroidal cavity which can be isolated from the surrounding environment at atmospheric pressure, and an inner tube which is inserted in said cavity and can be elastically expanded by means of the introduction of fluid under pressure into its internal volume and is provided with an inflating and deflating device which is inserted in the wall of said inner tube, wherein:

said rim comprises a substantially cylindrical body, the axis of which forms the axis of rotation of said wheel, the radially external surface of said body having two side portions designed to form said bead seats for engagement with corresponding beads of said tire, each arranged according to a conical surface with its apex on said axis of rotation in a position axially outside said seat with respect to said rim, and a radially more inward central portion with a maximum diameter less than the minimum diameter of said conical side portions;

said tire has a width in the region of said beads at least equal to its maximum width in the region of said sidewalls; and said inflating and deflating device located on said inner tube and having no connection to the rim;

said rim being provided with an inflating valve located in a wall of said rim, where cooperation between said inflating valve and said inflating and deflating device on the inner tube allows inflation and deflation of said inner tube.

2. Tire wheel according to claim 1, wherein the angle (w) of said conical surfaces with respect to the axis of rotation is between 4° and 30°.

3. Tire wheel according to claim 1, wherein said bead seats are axially delimited towards the outside each by a flange diverging in a direction radially outside the rim and inclined with respect to the equatorial plane at an angle of between 40° and 50°.

4. Tire wheel according to claim 1, wherein said bead seats are axially delimited towards the inside each by a shoulder, with its axially external surface converging towards the equatorial plane in a direction radially outside the rim and inclined with respect to said plane at an angle of between 0° and 30°.

5. Tire wheel according to claim 1, wherein the difference between the maximum diameter of said central portion, on the radially external surface of the cylindrical body, and the minimum diameter of the bead seats is between 10% and 20% of the value of said minimum diameter of the bead seats.

6. Tire wheel according to claim 1, wherein the difference between the external diameter of a flange axially delimiting at least one of the bead seats and the minimum diameter of the at least one bead seat is between 1% and 5% of the value of said minimum diameter.

7. Tire wheel according to claim 1, wherein said bead seats have a different distance from the axis of rotation of said wheel, the difference between the minimum diameter of the bead seat of larger diameter and the maximum diameter of the bead seat of smaller diameter, which is axially opposite, being between 3% and 6% of the value of said maximum diameter.

8. Tire wheel according to claim 7, wherein said rim is designed for mounting on the vehicle with the bead seat of larger diameter facing the vehicle itself.

9. Tire wheel according to claim 1, characterized in that each of said bead reinforcing cores comprises at least two radially superimposed layers of metal wires which are wound in turns arranged axially alongside one another and extending substantially over the entire axial extension of the corresponding bead seat and are arranged substantially parallel to the surface of the bead seat.

10. Tire wheel according to claim 9, wherein said layers are formed by wires made of steel with a high carbon content.

11. Tire wheel according to claim 9, wherein said layers comprise a spiral of a single metal wire, with a diameter of between 0.9 mm and 1.5 mm.

12. Tire wheel according to claim 9, wherein said layers comprise a spiral of stranded metal cord, the basic filaments of said strands having a diameter of between 0.22 mm and 0.38 mm.

13. Tire wheel according to claim 12, wherein said cord comprises seven strands of three filaments each, said filaments having a diameter of between 0.28 mm and 0.36 mm.

14. Tire wheel according to claim 9, wherein the minimum diameter of the radially innermost layer is not less than the diameter of an adjacent flange and its maximum diameter is not greater than the diameter of an adjacent shoulder.

15. Tire wheel according to claim 9, wherein the minimum diameter of the radially innermost layer is not less than the diameter of an adjacent flange and its maximum diameter is not greater than the diameter of an adjacent shoulder.

16. Tire wheel according to claim 9, wherein the end of said carcass ply is inserted, axially from the inside outwards, between the superimposed layers.

17. Tire wheel according to claim 16, wherein the end of said carcass ply comprises two axially separate portions of fabric, a first portion of fabric being arranged in a position radially inside the radially innermost layer of metal wires, a second portion of fabric being inserted in position radially inside the radially outermost layer of said wires, separated from the radially innermost layer by an insert of elastomeric material.

18. Tire wheel according to claim 17, wherein said insert extends radially beyond the axially internal end of said layers of metal wires towards the sidewall of the tire.

19. Tire wheel according to claim 17, wherein the hardness of said insert in not less than 70° Shore A.

20. Tire wheel according to claim 1, wherein said inner tube has been moulded and vulcanized with a toroidal shape having an internal volume not less than one third of a final volume of use.

21. Tire wheel according to claim 1, wherein said inner tube has been moulded and vulcanized with an elliptical shape.

22. Tire wheel according to claim 1, wherein said inner tube comprises at least two circumferential volumes which are separate and independent of one another, being separated by a longitudinal wall extended in a plane perpendicular to the axis of rotation of the wheel, each volume being provided with one of said inflating devices.

23. Tire wheel according to claim 22, wherein the longitudinal wall has a rigidity which is greater than that of the sidewalls of said inner tube.

24. Tire wheel according to claim 22, wherein the longitudinal wall contains at least one duct which extends internally over the whole radial extension of the longitudinal wall, opening out on both extrados and intrados surfaces of the inner tube.

25. Tire wheel according to claim 1, wherein said inflating and deflating device comprises a rigid body incorporating an inflating valve, a calibration valve, and a discharge valve.

* * * * *